(12) United States Patent
Mather et al.

(10) Patent No.: US 7,067,606 B2
(45) Date of Patent: Jun. 27, 2006

(54) NONIONIC TELECHELIC POLYMERS INCORPORATING POLYHEDRAL OLIGOSILSESQUIOXANE (POSS) AND USES THEREOF

(75) Inventors: Patrick T. Mather, Storrs, CT (US); Byoung-Suhk Kim, Jeoonju (KR); Qing Ge, Coventry, CT (US); Changdeng Liu, Storrs, CT (US)

(73) Assignee: University of Connecticut, Farmington, CT (US)

( * ) Notice: Subject to any disclaimer, the term of this patent is extended or adjusted under 35 U.S.C. 154(b) by 260 days.

(21) Appl. No.: 10/620,644

(22) Filed: Jul. 16, 2003

(65) Prior Publication Data

US 2004/0024098 A1 Feb. 5, 2004

Related U.S. Application Data

(60) Provisional application No. 60/399,599, filed on Jul. 30, 2002.

(51) Int. Cl.
C08G 77/04 (2006.01)

(52) U.S. Cl. .............................. 528/37; 528/33; 528/45; 526/307.5; 525/440

(58) Field of Classification Search .................... 528/37, 528/33, 45; 526/307.5; 525/440
See application file for complete search history.

(56) References Cited

U.S. PATENT DOCUMENTS

| 5,484,867 A | 1/1996 | Lichtenhan et al. |
| 5,589,562 A | 12/1996 | Lichtenhan et al. |
| 5,939,576 A | 8/1999 | Lichtenhan et al. |
| 5,942,638 A | 8/1999 | Lichtenhan et al. |
| 6,100,417 A | 8/2000 | Lichtenhan et al. |

FOREIGN PATENT DOCUMENTS

WO    WO 01 10871    2/2001

OTHER PUBLICATIONS

Vorobyova et al. "Fluorescent probe studies of the association in an aqueous solution of a hydrophobically modified poly(ethylene oxide)" Macromolecules, 31, 8998–9007(998).*

Hsiao et al. "Structural development during deformation of polyurethane containing polyhedral oligomeric silsesquioxanes (POSS) molecules" Polymer, 42,599–611 (2001).*

Vorobyova, O. et al., "Fluorescent Probe Studies of the Associate in an Aqueous Solution of a Hydrophobically Modified Poly(ethylene oxide)" Macromolecules 1998, 31, pp. 8998–9007.

Preuschen, J., et al., "Aggregation Behavior of a Symmetric, Fluorinated, Telechelic Polymer System Studied by $F^{19}$ NMR Relaxation," Macromolecules 1999, 32, ppp. 2690–2695.

(Continued)

Primary Examiner—Ling-Siu Choi
(74) Attorney, Agent, or Firm—Cantor Colburn LLP

(57) ABSTRACT

Amphiphilic telechelics incorporating polyhedraloligosilsesquioxane (POSS) synthesized by direct urethane linkage between the diol end groups of polyethylene glycol (PEG) homopolymers and the monoisocyanate group of POSS macromers. The hydrophobicity of the amphiphilic telechelics can be varied by using PEG homopolymers of increasing MW, providing for control over molecular architecture by hydrophilic/hydrophobic balance. Methods for synthesizing the amphiphilic telechelics and their use as surfactants, thickening agents, additives to plastic such as PMMA'(Plexiglass), epoxyadhesives for improving their properties are also disclosed.

19 Claims, 12 Drawing Sheets

¹H NMR spectrum of the amphiphilic telechelic of PEG8K.
*ssb indicates a spinning side band.

OTHER PUBLICATIONS

Nagashima, K., et al., "Diffusion of Model Hydrophobic Alkali–Swellable Emulsion Associative Thickeners," *Macromolecules* 2000, 33, pp. 9329–9339.

Lee, W.K. et al., "Synthesis and Surface properties of Fluorocarbon End–cCapped Biodegradable Polyesters," *Macromolecules* 2001, 34, pp. 3000–3006.

Maus, C., et al., "Shear thickening of halato–telechelic polymers in apolar solvents," *Polymer* vol. 36, No. 10, 1995, pp. 2083–2088.

Alami, E., et al., "Aggregation of Hydrophobically End–Capped Poly(ethylene oxide) in Aqueous Solutions," *Macromolecules* 1996, 29, pp 2229–2243.

Tirtaatmadja, V., et al., heological Properties of Model Alkali–Soluble Associative (HASE) Polymers: Effect of Varying Hydrophobe Chain Length , *Macromolecules* 1997, 30, pp. 3271–3282.

Tam, K. et al., A structural Model of Hydrophobically Modified Urethane–Ethoxylate (HEUR) Associative Polymers in Shear Flows, *Macromolecules* 1998, 31, pp. 4149–4159.

Tam, K. et al., heological Properties of Hyrdrophobically Modified Alkali–Soluble Polymers—Effects of Ethylene–Oxide Chain Length, *J. polym. Sci.: Part B: Polym Phys.*, 1998, 36, 2275–2290.

Bhargava, s. et al., "Effect of Water on Viscosity and Shear–Thickening Behavior of Telechelic Ionomers in Nonpolar Sovents," *Macromolecules* 1998, 31, pp. 508–514.

Vorobyova et al: "Determination of Aggregation Numbers in Aqueous Solutions of Hydrophobically Modified Polymers by Fluorescent Probe Techniques", 2000 American Chemcal Societyl, pp. 143–263.

Nomula et al: "Solution Structure and Shear Thickening Behavior of Ionomers and Hydrophobically Associating Polymers", 2000 American Chemical Society, pp. 127–142.

Schwab et al: "Hybrid Nanoreinforced Polyurethanes Based on Polyhedral Oligomeric Sisequioxanes (POSS)".

Schwab et al: "Hybrid Nanoreinforced Polyurethanes Based on Polyhedral Oligomeric Sisequioxanes (POSS)", Rapra Abstracts, Pergamon Press Ltd., Oxford; GB, vol. 77, No. 6, Jun. 1999, p. 122 XP000830182, ISSN: 0033–6750 abstract.

Fu B X et al: "Structural development during deformation of polyurethane containing polyhedral oligomeric silsequioxane (POSS) molecules" Polymer, Elsivier Science Publishers B.V., GB, vol. 42, No. 2, Jan. 2001 pp. 599–611, XP004216943 ISSN: 0032–3861 p. 600–601.

* cited by examiner

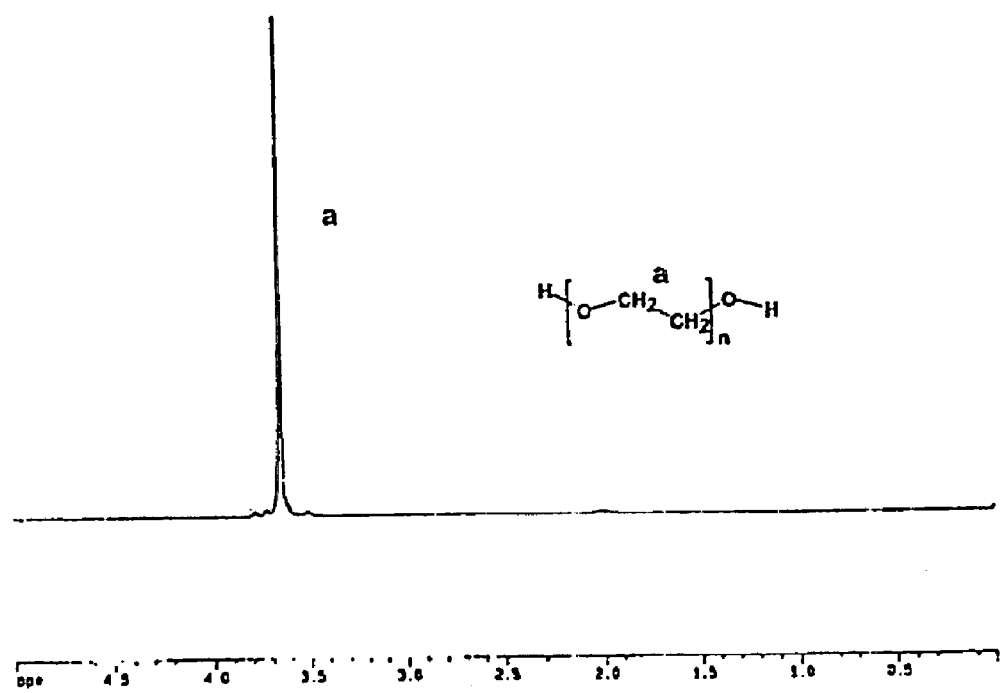
Figure 1(a). ¹H NMR spectrum of PEG8K homopolymer.

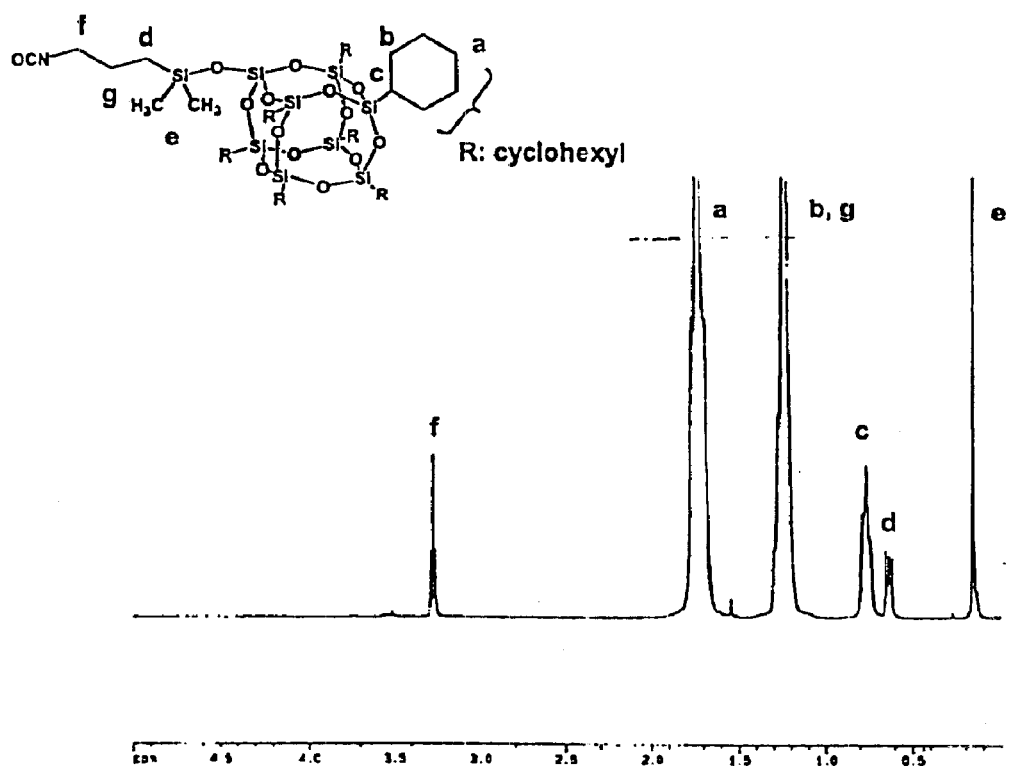
Figure 1(b). ¹H NMR spectrum of POSS macromer.

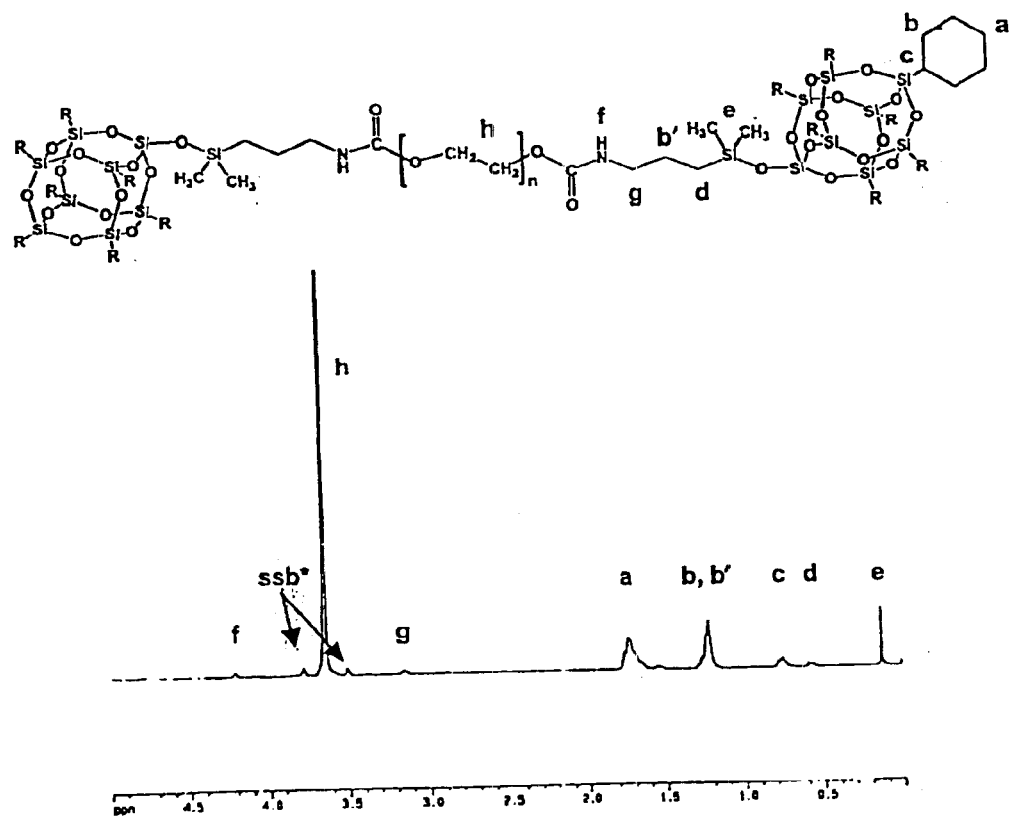
Figure 1(c). ¹H NMR spectrum of the amphiphilic telechelic of PEG8K.
*ssb indicates a spinning side band.

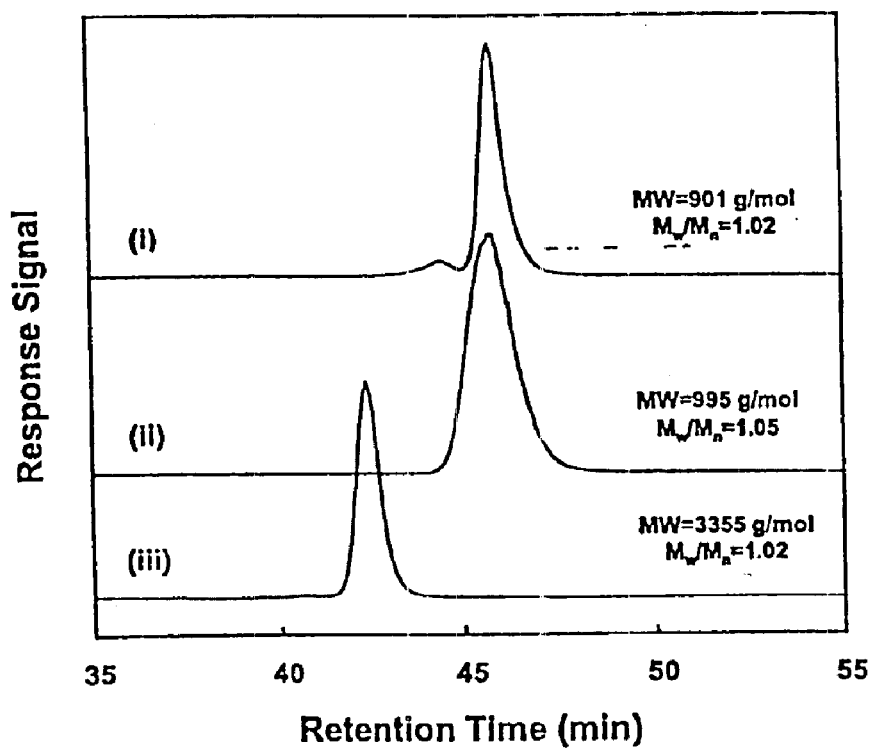
Figure 2(a). GPC Chromatograms of (i) POSS macromer, (ii) PEG1K homopolymer, and (iii) amphiphilic telechelic of PEG1K.

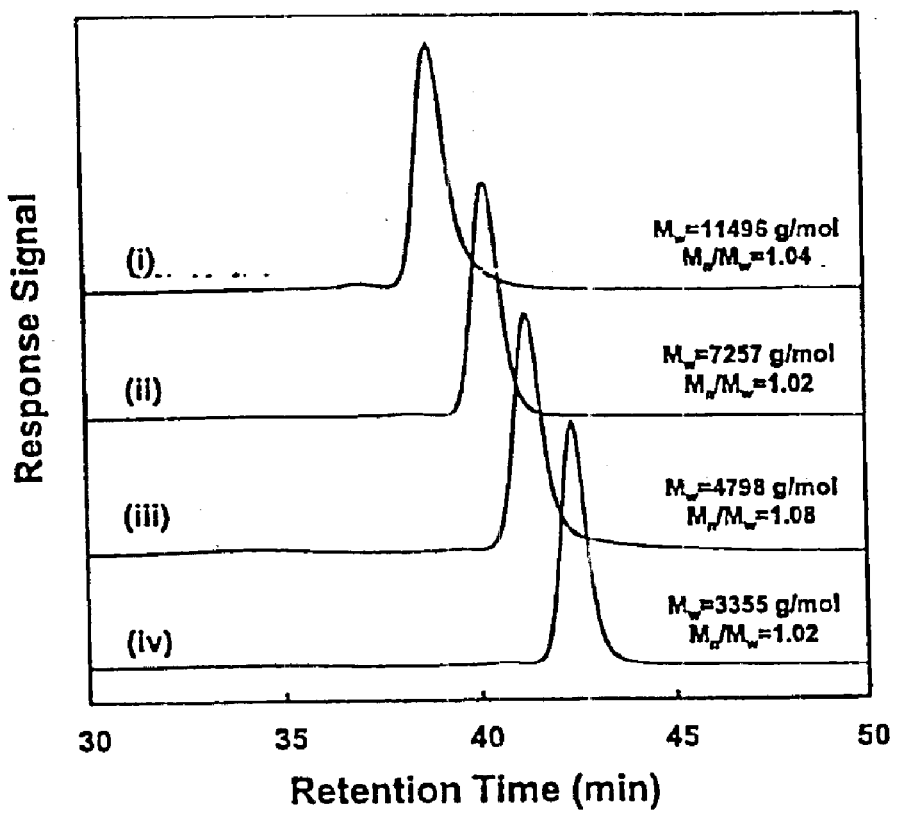
Figure 2(b). GPC Chromatograms of the amphiphilic telechelics of (i) PEG10K, (ii) PEG3.4K, (iii) PEG2K, and (iv) PEG1K.

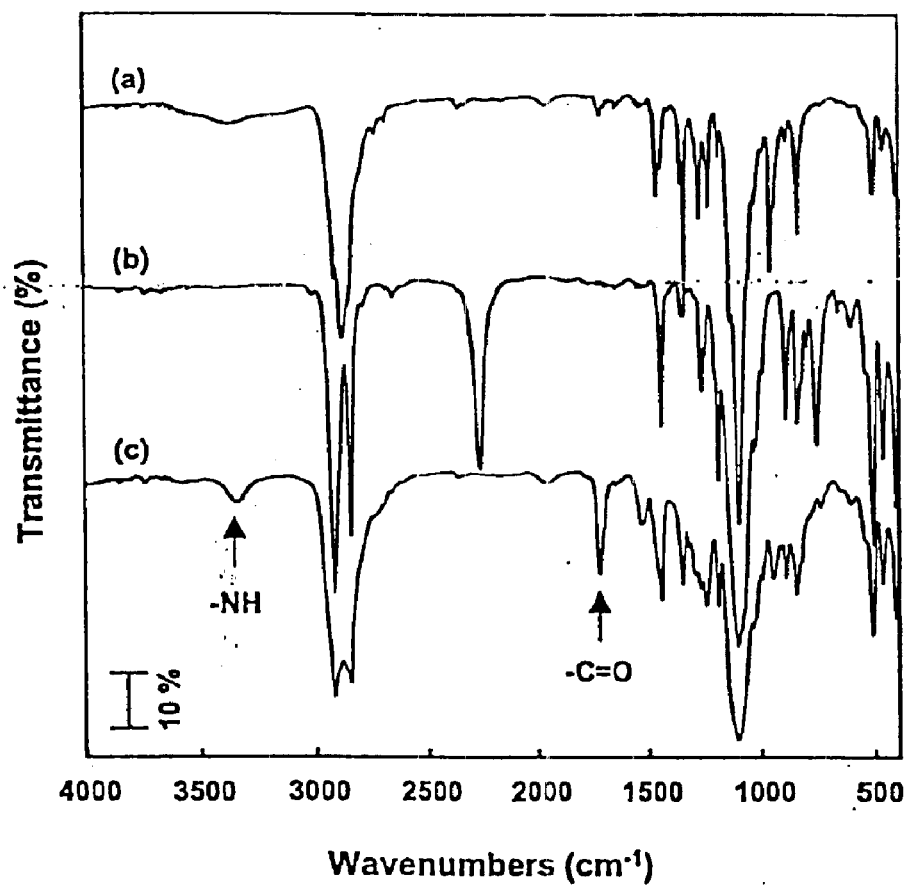
Figure 3. FT-IR spectra of (a) PEG3.4K homopolymer, (b) POSS macromer, and (c) amphiphilic telechelics of PEG3.4K.

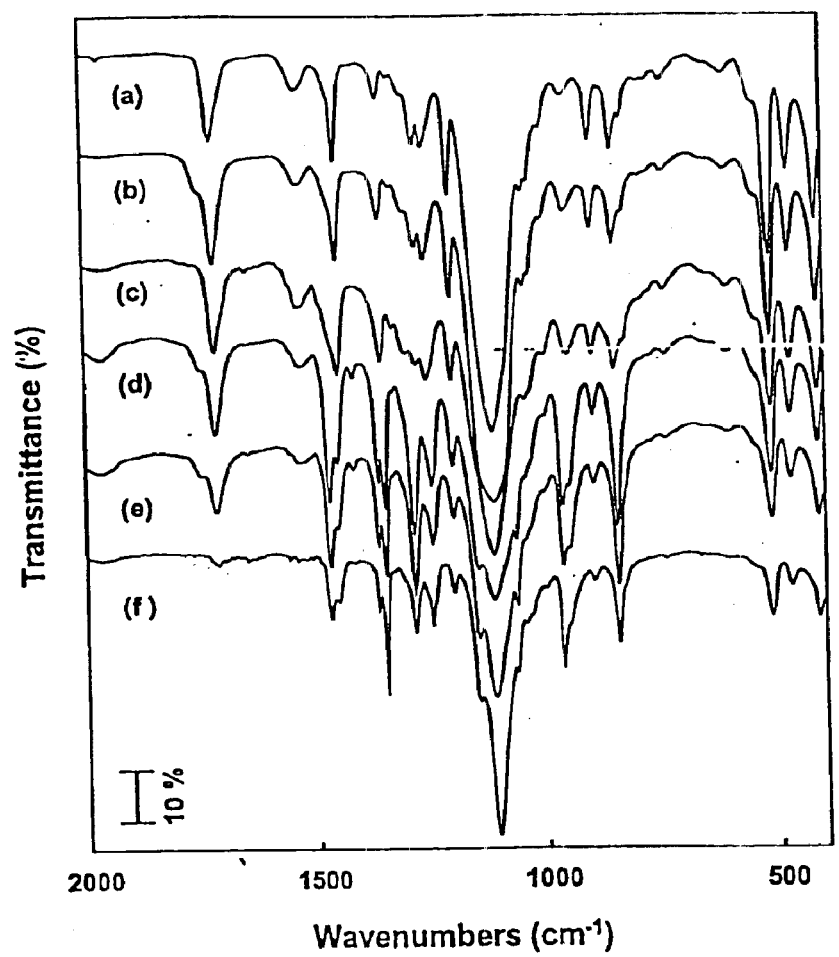
Figure 4. FT-IR spectra of amphiphilic telechelics of (a) PEG1K, (b) PEG2K, (c) PEG3.4K, (d) PEG8K, (e) PEG10K, and (f) PEG3.4K homopolymer.

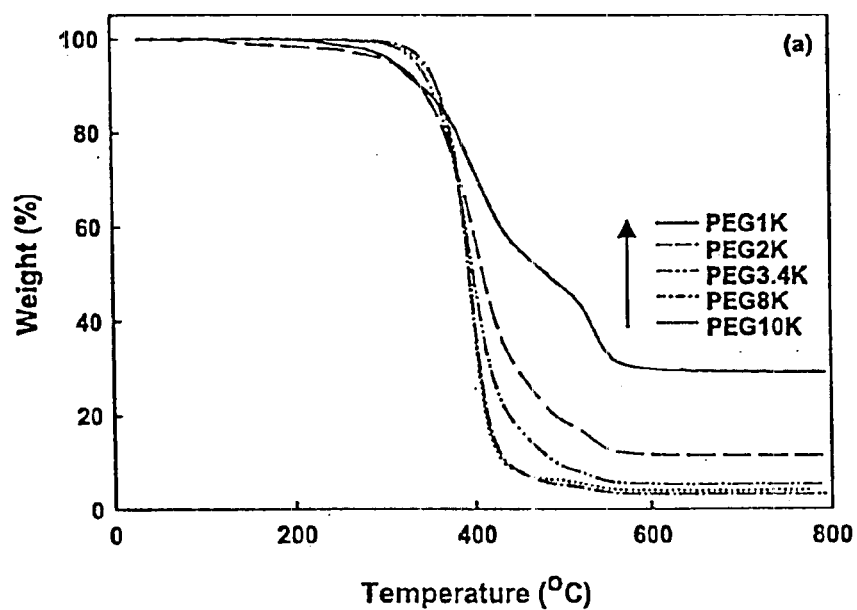
Figure 5(a). Thermogravimetric analysis of the amphiphilic telechelics.
A heating rate of 20 °C/min was applied to samples in a nitrogen environment.

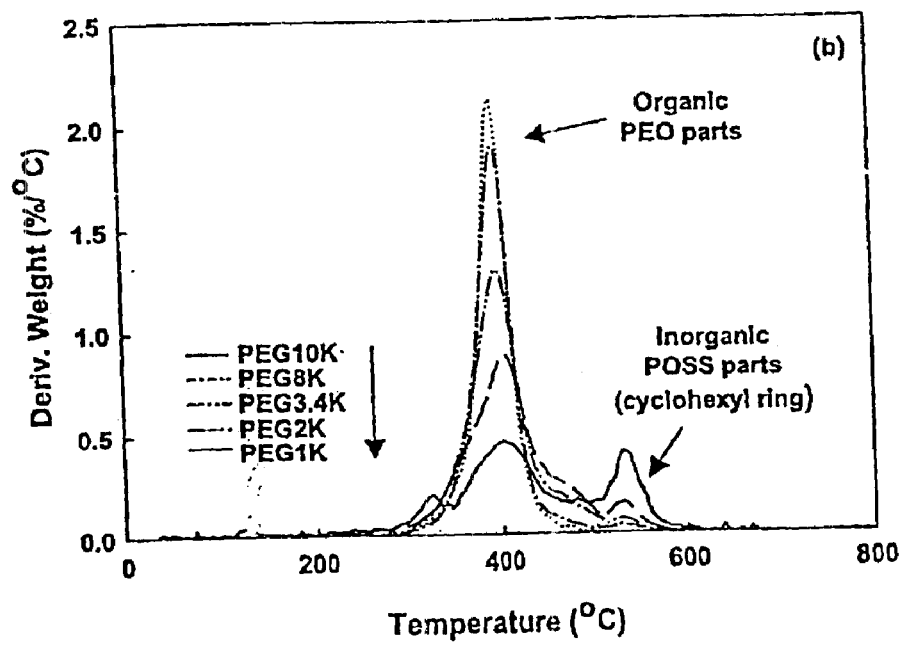
Figure 5(b). Thermogravimetric analysis of the amphiphilic telechelics. Here d(wt%)/dT is plotted to reveal a two-step decomposition process. Conditions same as Fig. 5(a).

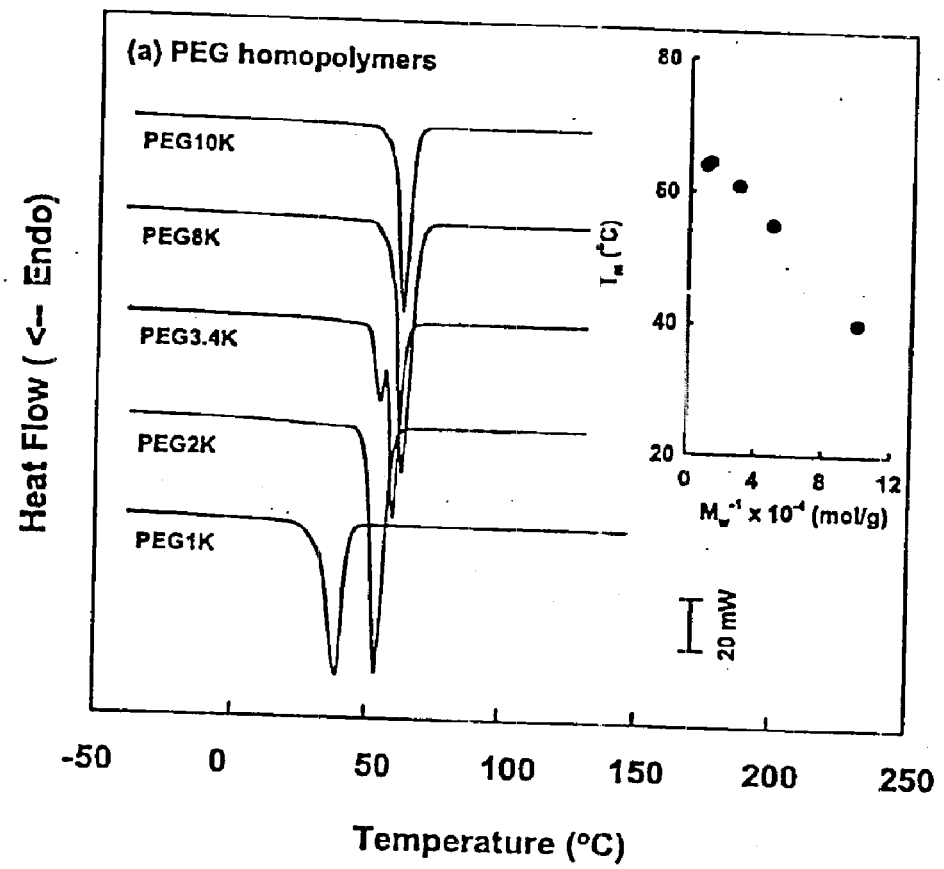
Figure 6(a). Differential scanning calorimeter (DSC) analysis of the PEG homopolymers.

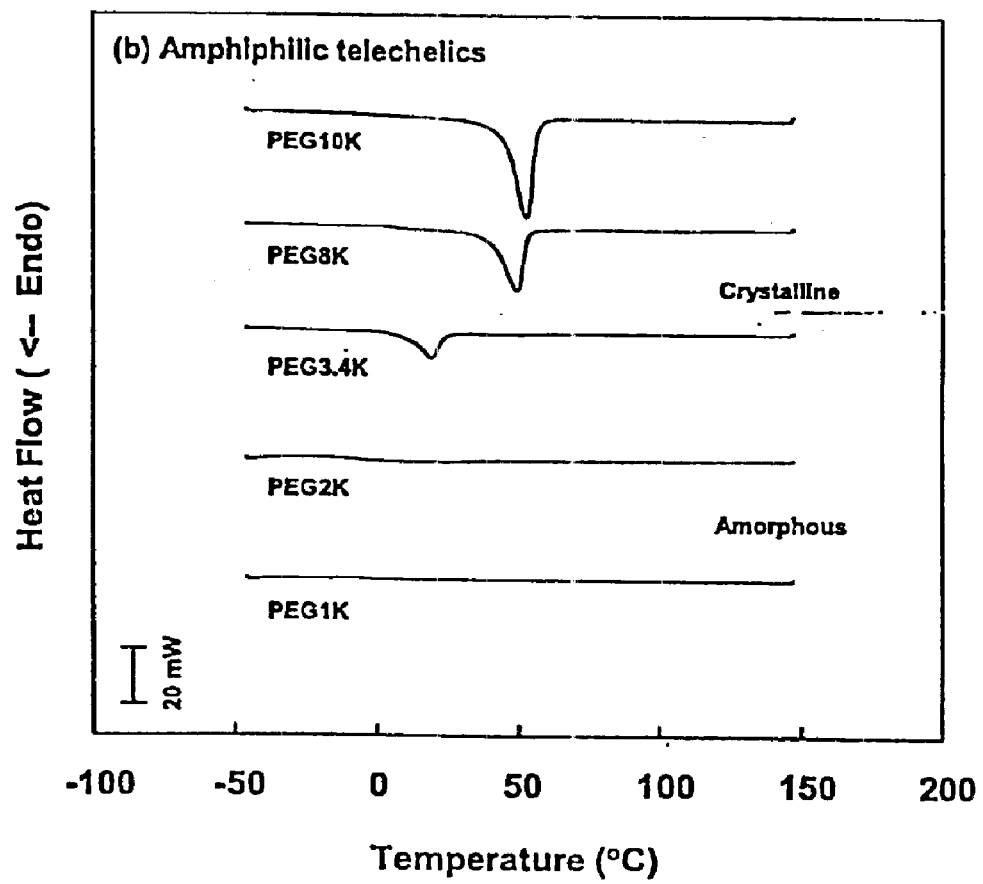
Figure 6(b). Differential scanning calorimeter (DSC) analysis of the amphiphilic telechelics.

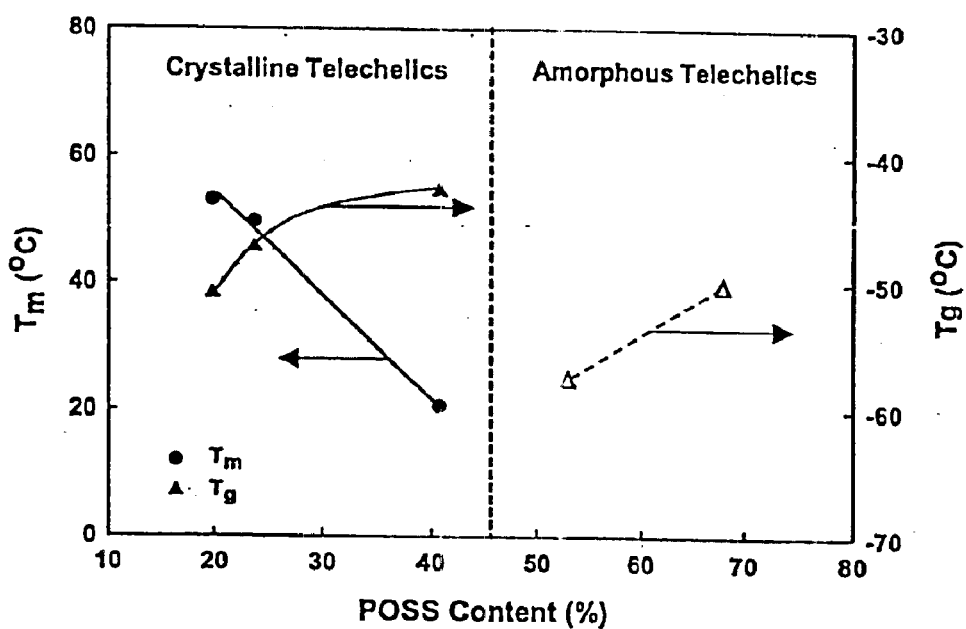
Figure 7. Effects of POSS content on $T_m$ and $T_g$ of PEO segments in the amphiphilic telechelics.

NONIONIC TELECHELIC POLYMERS INCORPORATING POLYHEDRAL OLIGOSILSESQUIOXANE (POSS) AND USES THEREOF

This application claims the priority of Provisional Application Ser. No. 60/399,599 filed Jul. 30, 2002.

GOVERNMENT SUPPORT

This invention is supported, in whole or in part by Grant number F49620-00-1-0100 from AFOSR. The U.S. Government has certain rights in the invention.

This invention relates to amphiphilic telechelics incorporating polyhedral oligosilsesquioxane (POSS). More particularly, this invention relates to amphiphilic telechelics incorporating POSS macromers as end groups of PEG homopolymers.

BACKGROUND OF THE INVENTION

Generally, when amphiphilic block copolymers are dissolved in a solvent which is selective for only one of the blocks, nanosized aggregates form due to the self-assembly of the less soluble segment. The term "water-soluble associating polymer" is given to those polymers constituted by a hydrophilic skeleton that bears some hydrophobic groups either randomly distributed along the chain (grafted or comb-like) or fixed at one or two extremities (telechelic). Telechelic polymers are linear chains containing associating "sticker" groups only at the chain ends, and are analogous to the triblock copolymers. The difference is in the shortness of the aliphatic "tail" group compared to the block size of typical triblocks. A telechelic polymer, therefore, bears features of both surfactants and block copolymers; it contains two surfactant-sized hydrophobic groups attached to a polymer-sized hydrophilic one. The telechelic polymers developed to date are most often based on poly(ethylene oxide) (PEO). Hydrophobic groups can be either aliphatic (with a number of methylene units ranging from 8 to 20), aromatic, or fluorinated. Such architectures lead to significant alteration of solution properties, often with water as solvent. In particular, it is well known that aqueous solutions exhibit shear-thickening and shear-thinning behaviors owing to the fact that hydrophobic groups associate pairwise or into larger nano-domains, which act as temporary cross-links or chain extensions. This thickening behavior renders the polymers useful as additions that even at low loading levels, allow for adjustment of viscosity for purposes of processing, for example in coating applications, or in the formulation of products such as shampoo, facial cream, toothpaste and the like. Such self-assembly behavior of block copolymers and of hydrophobically modified polymers has been extensively studied as a building block approach to the processing of nanostructured materials beginning at the molecular level.

Several morphologies found in crew-cut aggregates made from two families of diblock copolymers, polystyrene-b-poly(acrylic acid) (PS-b-PAA) and polystyrene-b-poly(ethylene oxide) (PS-b-PEO), in dilute solution have been described. As the soluble PAA or PEO blocks are made progressively shorter, the morphology of the aggregates changes from spherical to rodlike to lamellar or vesicular and finally to large compound vesicles (LCVs) and large compound micelles The synthesis, characterization, and rheological behavior of a concentration-series of PEG end-capped with hydrophobic fluorocarbon groups has also been disclosed. Further the synthesis data on the aggregation of silsesquioxane-based amphiphiles; the cubic-shaped spherosilsesquioxane, 1-(1,ω-propylenemethoxy)oligo(ethylene oxide)-3,4,7,9,11,13,15-heptahydridopentacyclo [$9.5.1^{3.9}.1^{5.15}.1^{7.13}$]octasiloxane has been described. However, these silsesquioxane-based amphiphiles were monosubstituted.

To date, amphiphilic telechelics incorporating polyhedral oligosilsesquioxane (POSS) macromers have not been described. Such POSS macromers can represent interesting building units for the construction of organic-inorganic hybrid structures as compared to other hydrophobic groups, such as the linear aliphatic, aromatic, or fluorinated groups previously investigated. Amphiphilic telechelics having a hydrophobic, bulky, and well-defined dimensional property such that both end groups as has been proposed herein can contribute to self-assembly while contributing steric hindrance properties in the solution and melt state and have not been described. Moreover their partially inorganic composition offers the potential for conversion to ceramic ($SiO_2$/SiC) nanostructures. Additionally, the new polymers yield control over polyethylene oxide crystallization which is of benefit to their application as solid polymer electrolytes for ion-conducting batteries, such as lithium-ion batteries.

It is an object of this invention to provide a method for synthesis of a series of amphiphilic telechelics incorporating POSS macromers as end groups of polyethyleneglycol (PEG) homopolymers.

It is a further object of the invention to provide new amphiphilic telechelics incorporating POSS macromers.

It is another object of the invention to provide new amphiphilic telechelics that incorporate POSS macromers as end groups of PEG homopolymers.

It is yet another object of the invention to provide new amphiphilic telechelics having predetermined hydrophilic/hydrophobic balance by use of PEG homopolymers of varying molecular weight.

A further object of the invention is to provide new amphiphilic telechelics which are useful as nonionic surfactants with enhanced thickening behavior.

A further object of the invention is to provide new amphiphilic telechelics which are useful as solid polymer electrolytes for ionic batteries.

Still a further object of the invention is to provide new amphiphilic telechelics which are useful to improve toughness of polymers that are compatible with poly(ethylene oxide), including but not limited to epoxy, poly(methylmethacrylate), poly(vinylacetate), poly(ethylmethacrylate), sulfonated polystyrene and polysulfone.

SUMMARY OF THE INVENTION

Broadly, the invention comprises the synthesis of amphiphilic telechelics incorporating POSS macromers was achieved by forming a urethane bond between a monoisocyanate group of a POSS macromer and each hydroxyl group of a PEG homopolymer. The reaction scheme follows:

Reaction Scheme of the Amphiphilic Telechelics Incorporating Polyhedral Oligosilsesquioxane (POSS)

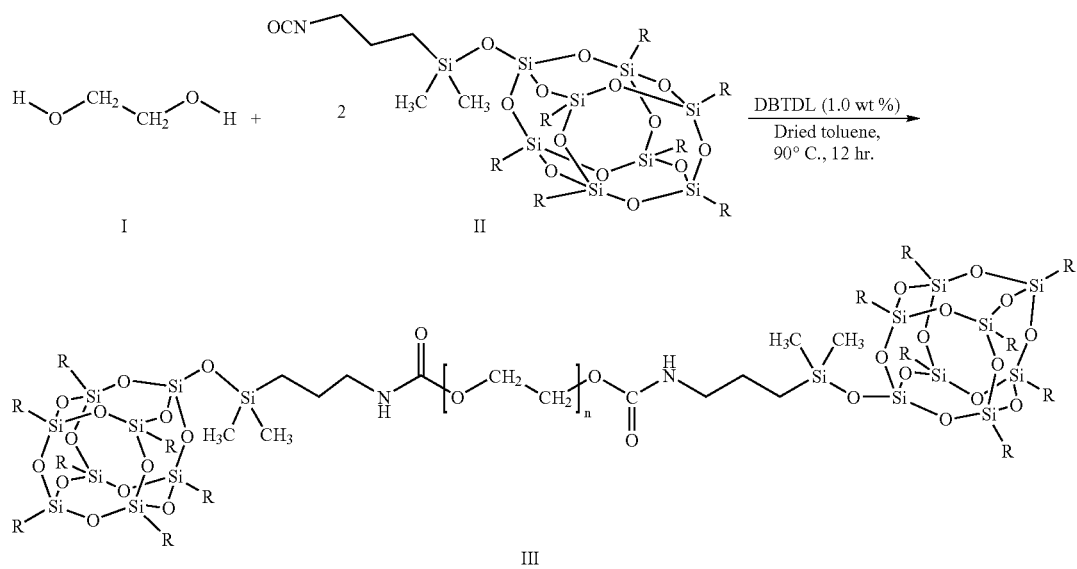

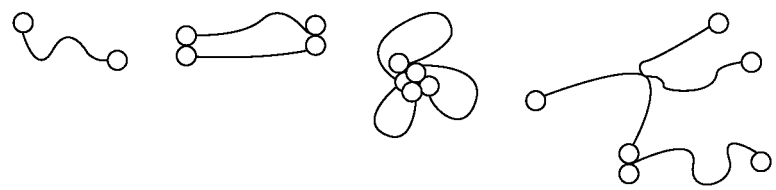

R = cyclohexyl
I: Poly(ethylene glycol) (PEG); MW = 1k, 2k, 3.4k, 8k, 10k g/mol.
II: Isocyanatopropyldimethylsilycyclohexyl-POSS (POSS macromer).
III: Amphiphilic telechelics incorporating POSS.
Expected Molecular Architectures Linear polyethylene glycol (PEG) homopolymers of different molecular weights were used for controlling the molecular architecture by hydrophobic/hydrophilic balance and thus to vary the hydrophobicity of the synthesized amphiphilic telechelics. It is believed that the physical spacing between both hydrophobic end groups of the amphiphilic telechelics may also have an important role in both the liquid-state aggregation and solid-state morphological behavior.

A number of amphiphilic telechelics were synthesized by using PEG homopolymers of different molecular weight (MW=1 k, 2 k, 3.4 k, 8 k and 10 k g/mol). The weight percentages of POSS macromers in the amphiphilic telechelics were controlled to be 18.7, 22.3, 40.3, 53.5, 69.7% in the feed, respectively. As a result, while PEG homopolymers are soluble in water and POSS macromers are soluble in hexane, the synthesized amphiphilic telechelics did not dissolve in either water or hexane, suggesting that incorporation of the hydrophobic POSS macromers onto PEG homopolymers gave rise to dramatically altered solubility. Compositions within the scope of the present invention include those prepared from any PEG homopolymer having molecular weights ranging from 62 g/mol (n=1, ethylene glycol) to $10^6$ g/mol (n~23,000).

BRIEF DESCRIPTION OF THE DRAWINGS

FIG. 1(a) shows the $^1$H NMR spectrum of PEG8K homopolymer;

FIG. 1(b) shows the $^1$H NMR spectrum of POSS macromer;

FIG. 1(c) shows the $^1$H NMR spectrum of the amphiphilic telechelic of PEG8K

FIG. 2(a) depicts GPC chromatograms of (1) POSS macromer (ii) PEG1K homopolymer and (iii) amphiphilic telechelic of PEG1K;

FIG. 2(b) depicts GPC chromatograms of the amphiphilic telechelics of (i) PEG10K, (ii) PEG3.4K, (iii) PEG2K and (iv) PEG1K;

FIG. 3 illustrates the FT-IR spectra of (a) PEG3.4K homopolymer, (b) POSS macromer and (c) amphiphilic telechelics of PEG 3.4K;

FIG. 4 shows the FT-IR spectra of amphiphilic telechelics of (a) PEG1K, (b) PEG2K, (c) PEG3.4K, (d) PEG8K, (e) PEG10k and (f) PEG3.4K homopolymer;

FIG. 5(a) shows the thermogravimetric analysis of the amphiphilic telechelics;

FIG. 5(b) shows the thermogravimetric analysis of the amphiphilic telechelics, plotted to show the two-step decomposition behavior;

FIG. 6(a) illustrates the differential scanning calorimeter (DSC) analysis of the PEG homopolymers;

FIG. 6(b) illustrates the differential scanning calorimeter (DSC) analysis of the amphiphilic telechelics; and FIG. 7 shows the effects of POSS content on $T_m$ and $T_g$ of PEO segments in the amphiphilic telechelics.

DETAILED DESCRIPTION OF THE INVENTION

Well-defined amphiphilic telechelics incorporating polyhedral oligosilsesquioxane (POSS) were synthesized by direct urethane linkage between diol end groups of poly(ethylene glycol) (PEG) homopolymer and the monoisocyanate group of POSS macromer according to the reaction scheme set out above. The synthesized amphiphilic telechelics showed a relatively narrow and unimodal molecular weight distribution ($M_w/M_n$<1.1) and had close to 2.0 end-groups per PEG chain. The thermal stability of the synthesized amphiphilic telechelics was enhanced above 400° C. due to the incorporated inorganic POSS macromers. Amphiphilic telechelics with POSS contents of 19.8, 23.6, 40.7, 52.7, and 68.1% depending on the molecular weights of PEG homopolymers were synthesized. The crystallinity of PEO segments in the amphiphilic telechelics was dramatically decreased when the POSS content in the amphiphilic telechelic is 40.7%, and became amorphous beyond about 50%. $T_g$ values of the PEG segments in the amphiphilic telechelics of PEG 10K, 8K and 3.4K were progressively shifted to higher temperature with an increase of POSS content, possibly due to the rigid properties of the incorporated POSS macromers. On the other hand, $T_g$ values of PEO segments in the amphiphilic telechelics of PEG1K and PEG2K are slightly decreased with an increase of POSS content, due to the disruption of PEO crystalline segments by incorporating the bulky and hydrophobic POSS macromers, resulting in the amorphous state. Amphiphilic telechelics were obtained having different thermal and morphological properties by controlling the balance of the hydrophilic PEG homopolymer and hydrophobic and bulky POSS macromers. The synthesized amphiphilic telechelics provide for strong alterations in solution rheological behavior (i.e., associative thickening), and further provide novel preceramic assemblies for the creation of controlled nanostructures via a building-block approach.

The following examples serve to illustrate the invention and are not to be construed as limitations thereof in any way.

EXAMPLES

Materials

Poly(ethylene glycol) (PEG) having molecular weights (MW)=1000, 2000, 3400, 8000, and 10000 g/mol, designated as PEG1K, PEG2K, PEG3.4K, PEG8K, and PEG10K, respectively, were obtained from Aldrich. All PEGs were purified by twice repeating the process of precipitation into n-hexane from chloroform solutions, followed by drying under vacuum overnight. Isocyanatopropyldimethylsilylcyclohexyl-POSS (POSS macromer) was provided by the Air Force Research Lab, AFRL/PRSM, and its chemical structure was confirmed by $^1$H NMR spectroscopy. Dibutyl tin dilaurate (DBTDL; Aldrich, 95% purity) as a catalyst for urethane formation was used as received. Toluene and tetrahydrofuran (THF) were dried over $CaH_2$, and then distilled under nitrogen prior to use.

Solutions of PEG homopolymer and POSS macromer were prepared separately in dried toluene. The PEG solution was charged in a four-necked flask, equipped with a stirrer, a nitrogen inlet, an outlet, and a thermometer. A mixture of PEG and toluene was further predried by azeotropic distillation, and the concentration was controlled to approximately 10% (w/v). The mixture was cooled to 90° C. and POSS macromer (0.69 g, 0.60 mmol) solution, containing 1.0 wt % of catalyst (DBTDL) based on the weight of the reactant, was added slowly via syringe within 20 minutes into a flask containing a pre-weighed amount of PEG (MW=10 k, 3.00 g, 0.30 mmol). These reactants were miscible throughout the synthesis as indicated by the clarity of the solution. The reaction mixture was kept at 90° C. under a nitrogen atmosphere for about 12 hours. Then the reaction mixture was microfiltered (0.45 μm), precipitated in an excess amount of n-hexane, washed with fresh n-hexane several times to remove the unreacted POSS macromer and catalyst, and then the precipitated telechelic was separated by filtration. The isolated product was subsequently washed with deionized water to remove unreacted homopolymer PEG, as a precautionary measure; however, no PEG was detected in the wash water.

Additional amphiphilic telechelics having different MWs of PEO segments were also synthesized following this procedure. The resulting products were dried under vacuum for at least 2 days to remove residual solvent. Products in the physical form of a white powder were obtained. The product yield in all cases was more than 90%, within experimental error. A schematic depiction of the synthetic procedure has been set out above.

In order to identify the chemical structures of the product polymers, FT-IR spectra were recorded with a Nicolet MAGNA-IR 560 spectrometer using neat films cast from $CHCl_3$ solution upon KBr windows. All measurements were made at room temperature within several minutes after drying the film KBr window under vacuum. Special care was also taken to avoid absorption of moisture while transferring samples from the oven to the spectrometer. In order to establish their chemical structures, $^1$H NMR spectra were recorded with a Bruker 500MHz DMX500 high-resolution spectrometer in $CDCl_3$ using tetramethylsilane (TMS) as an internal standard. Gel permeation chromatography (GPC, Waters Associates, 150-C Plus) with a PL-ELS 1000 control detector (Polymer Laboratories) was used to obtain molecular weights (MWs) and molecular weight distributions (MWDs). The samples, dissolved in THF, were injected at 35° C. with THF as an eluent, and at a flow rate of 1.0 mL/minute. The sample concentration was about 0.1 wt %. GPC data reported for the MWs and MWDs of the synthesized amphiphilic telechelics were relative to a calibration based on monodispersed polystyrene standards (472, 982, 4000, 6930, 43000, 200000, 400000, and 824000 g/mol; Polymer Standards Service-USA, Inc.).

The glass-transition temperatures ($T_g$) and melting temperatures ($T_m$) were determined using a TA Instruments differential scanning calorimetry (DSC 2920) equipped with a liquid nitrogen cooling accessory (LNCA) unit under a continuous nitrogen purge (50 mL/minute). The samples were first heated from room temperature to 150° C. at a fast heating rate of 40° C./minute to remove any previous thermal history and then quenched to −150° C. with liquid nitrogen or cooled to −50° C. at a cooling rate of 10° C./minute after isothermal treatment at 150° C. for about 30 minutes. Data were gathered on the second heating runs with scan rates of 10° C./minute. All of the samples were dried under vacuum overnight before measurement. A sample of pure indium was used to calibrate the measurements of temperature and latent heat. Reported $T_g$ values were defined as the temperatures corresponding to the midpoints of heat capacity change.

The thermal stability of the synthesized amphiphilic telechelics was analyzed by thermogravimetry (TGA) using a TA Instruments TGA 2950 under a continuous nitrogen purge of 50 mL/minute. The samples were heated from room temperature to 800° C. with a uniform heating rate of 20° C./minute. The residual char mass percentage, $m_{ch}$, was taken as the mass percentage remaining at T=700° C.

The synthesized amphiphilic telechelics were characterized by $^1$H NMR, GPC, and FT-IR spectroscopy. The $^1$H NMR spectra of the PEG8K homopolymer, the POSS macromer, and the synthesized amphiphilic telechelic for PEG8K, respectively: PEG8K homopolymer (FIG. 1a), (CDCl$_3$) δ 3.5 ppm (—CH$_2$—); the POSS macromer (FIG. 1b), (CDCl$_3$) δ 3.27 ppm (—CH$_2$—NCO), δ 1.73 ppm (cyclohexyl ring, —CH$_2$—), δ 1.2 ppm (cyclohexyl ring, —CH$_2$—CH— and —CH$_2$—CH$_2$—NCO), δ 0.76 ppm (cyclohexyl ring, —CH$_2$—C(CH$_2$)H—), δ 0.63 ppm (—O—Si(CH$_3$)$_2$—CH$_2$—), δ 0.16 ppm (—O—Si(CH$_3$)$_2$—CH$_2$—); and the synthesized amphiphilic telechelic for PEG8K (FIG. 1c), (CDCl$_3$), δ 4.2 ppm (—NH—COO—), δ 3.6 ppm (—CH$_2$—), δ 3.15 ppm (—CH$_2$—NH—COO—), δ 1.73 ppm (cyclohexyl ring, —CH$_2$—), δ 1.2 ppm (cyclohexyl ring, —CH2-CH— and —CH$_2$—CH$_2$—NCO), δ 0.76 ppm (cyclohexyl ring, —CH$_2$—C(CH$_2$)H—), δ 0.63 ppm (—O—Si(CH$_3$)$_2$—CH$_2$—), δ 0.16 ppm (—O—Si(CH$_3$)$_2$—CH$_2$—). Evidence for the formation of urethane linking groups was shown by the emergence of a weak proton signal at about 4.2 ppm, accompanied by the disappearance of a proton signal of —CH$_2$—NCO group (3.27 ppm). This clearly indicates the formation of the urethane bond, even though the urethane signals were too small to be analyzed quantitatively. The level of incorporation of POSS macromers in the amphiphilic telechelics could be determined quantitatively by the monitoring of the resonances for the cyclohexyl groups of POSS macromer. and were obtained by comparing the ratio of the PEG —CH$_2$— (δ=3.5 ppm; "h" in FIG. 1(c)) integration value, normalized to that for a single proton, to the average integration value for the POSS macromer —O—Si(CH$_3$)$_2$—CH$_2$— (δ 0.16 ppm; "e" in FIG. 1(c)) integral. The compositions of the synthesized amphiphilic telechelics thus calculated by $^1$H NMR are detailed in Table 1 which follows:

TABLE 1

Molecular characteristics of the amphiphilic telechelics

| (POSS)$_a$/ (EG)$_b$/ (POSS)$_a$ | [PEG]/ [POSS] by NMR | Calculated M$_w$$^c$ | M$_w$ by NMR | POSS Composition$^d$ (wt %) | M$_w$ by GPC | M$_w$/ M$_n$$^e$ |
|---|---|---|---|---|---|---|
| 1/22/1 | 1/2.15 | 3300 | 3472 | 68.1 | 3355 | 1.02 |
| 1/44/1 | 1/2.16 | 4300 | 4484 | 52.7 | 4798 | 1.08 |
| 1/74/1 | 1/2.03 | 5700 | 5734 | 40.7 | 7257 | 1.02 |
| 1/174/1 | 1/1.94 | 10300 | 10231 | 23.6 | 15642 | 1.03 |
| 1/217/1 | 1/1.86 | 12300 | 12139 | 19.8 | 11496 | 1.04 |

$^a$POSS: propyl dimethyl silyl cyclohexyl polyhedral oligosilsesquioxane,
$^b$EO: ethylene oxide.
The number indicate block length, e.g., 1-22-1 indicates a ethylene oxide block length of 22 units attached to the both POSS materials.
[PEG]/[POSS] = 1/2 in Feed.
$^c$Calculated using the following equation;
MWs of amphiphilic telecholics = MWs of PEGs + 2 ([POSS]/[PEG] in feed) x MW of POSS macromer.
$^d$Determined by $^1$H NMR.
$^e$Determined by GPC.

The calculated concentration of POSS macromers in the products was quite consistent with the feed ratio. The well-defined amphiphilic telechelics having a chain end functionality >95% (~a degree of end functionalization of more than 1.9) could be obtained, as calculated by $^1$H NMR spectroscopy. It is noted that the amphiphilic telechelics of PEG1K (POSS content=68.1%, as calculated by $^1$H NMR spectroscopy) and PEG2K (POSS content=52.7%) show chemical composition similar to that of an ABA triblock copolymer, on a weight percentage basis, where A and B represent hydrophobic POSS and hydrophilic PEO sequences, respectively.

Hydrophobic ethoxylated urethane (HEUR) polymers which are prepared by a chain extension reaction of an oligomeric PEO with a diisocyanate, followed by end-capping with an aliphatic alcohol are generally characterized by a relatively broad MWD (M$_w$/M$_n$≈2) and not all of the polymer molecules contain two hydrophobic end groups. In contrast, GPC analysis of the invention produced amphiphilic telechelic of PEG3.4K, for example showed a very narrow and unimodal molecular weight distribution (M$_w$/M$_n$<1.1), as is shown in FIG. 2a, indicating that the diol groups of PEG homopolymers had completely reacted with the monoisocyanate groups of the POSS macromers. There was additionally no evidence of unreacted PEG homopolymers and POSS macromers. The GPC chromatograms of the amphiphilic telechelics (FIG. 2b) also revealed systematic increases in MW afforded by covalent linkage PEG homopolymers with POSS macromers. The MWs of the amphiphilic telechelics of PEG 3.4K and PEG8K did not exactly coincide with the calculated values. Surprisingly, the measured molecular weight for the amphiphilic telechelic of PEG8K was about 1.5 times larger than calculated. Although this is not fully understood, it is hypothesized that the formation of small aggregates in the organic elution solvent, THF has taken place, even though it is good solvent. That is, because the retention time depends on the hydrodynamic volume of the eluting species, suggesting that the aggregated structures possess similar size resulting in the higher average MW.

The FT-IR spectra of the PEG3.4K homopolymer, the POSS macromer and the synthesized amphiphilic telechelic for PEG3.4K homopolymer are shown in FIGS. 3(a), 3(b) and 3(c) respectively. In the case of the amphiphilic telechelic for PEG3.4K homopolymer (FIG. 3(c)), new carbonyl (—C=O) and amine (—NH) bands appear at 1720 cm$^{-1}$ and 3350 cm$^{-1}$ respectively. The telechelic spectra also show strong absorption bands in the 2800–3000 cm$^{-1}$ range assignable to the aliphatic (asymmetric and symmetric) C—H stretching vibrations; at 1530 cm$^{-1}$, the N—H bending vibration; at 1467 cm$^{-1}$, the —CH$_2$— bending vibration in aliphatic hydrocarbon; in the 1000–1300 cm$^{-1}$ range, the strong C—O and Si—O stretching vibrations; in the 1200–1400 cm$^{-1}$, Si—CH$_3$ and Si—CH$_2$ bending vibrations; at 963 and 843 cm$^{-1}$, the characteristic bands of the crystalline phase of PEG segments; and at 895 and 848 cm$^{-1}$, the rocking vibration of cyclohexyl-ring structure. The disappearance of the weak broad absorption band at 3400 cm$^{-1}$ is attributed to the H-bonded hydroxyl end groups (—OH) of the PEG homopolymer (FIG. 3(b)) and characteristic strong absorption band at 2260 cm$^{-1}$ attributed to the isocyanate group (—NCO) of POSS macromer (FIG. 3(c)), together establishing the urethane bond formation between the terminal hydroxyl group of PEG homopolymers and the isocyanate group of POSS macromers. In addition, as shown in FIG. 4, as the POSS content increased, the intensity of the absorption bands at 1720, 1467, 947 and 843 cm$^{-1}$ attributed to the C=O stretching, N—H bending, and cyclohexyl-ring rocking vibrations, also increased. On the other hand, the intensity of the absorption bands at 947 and 843 cm$^{-1}$, which are the characteristic bands of the crystalline phase of PEO segments, decreased. It was found that the absorption intensity at 1467 cm$^{-1}$ attributed to the —CH$_2$— bending vibration in aliphatic hydrocarbon decreases with the increase of POSS content, while the absorption intensity at 1447 cm$^{-1}$ attributed to the —CH$_2$— bending vibrations in the strained cyclohexyl ring increases. The data confirms that the structures shown in the reaction scheme depicted above are accurate.

On the basis of the high thermal stability possessed by POSS macromers, the thermal stability of the synthesized amphiphilic telechelics incorporating POSS was expected to be improved over unmodified PEG homopolymers. The TGA results for the synthesized amphiphilic telechelics, as seen from FIG. 5(a) shows that as POSS macromer content in the amphiphilic telechelics increases, thermal stability for T>400° C. increased significantly with wt % curves shifting to higher temperatures in an amount dependent on the chain length of the intervening backbone, PEO segments, the shorter the PEO segments, the higher the decomposition temperature and the larger the residue. These results confirm the enhanced thermal stability of the amphiphilic telechelics due to the incorporation of POSS macromers. In addition, the degradation patterns of the amphiphilic telechelics in nitrogen are different from PEG homopolymers. While PEG homopolymers exhibit one-step decomposition behavior, amphiphilic telechelics show two-step decomposition behavior (FIG. 5(b)). The first derivative peak is attributed to the decomposition of the organic PEO fraction, while the second peak is attributed to the inorganic POSS fraction, probably attributable to the cyclohexyl ring of the incorporated POSS macromers.

magnitude of this shift is difficult to quantify. Such a result, nonetheless, demonstrates that direct incorporation of the rigid POSS macromers onto PEO chains may retard the chain movement and alter amorphous chain dynamics due to its large tethered mass. In the case of the amphiphilic telechelics of PEG1K and PEG2K, sharp endothermic peaks were not found (FIG. 6(b)) as was the case of PEG1K and PEG2K homopolymers. The absence of such melting endotherms is believed to be due to complete disruption of the orderly lamellar folding pattern of the PEO crystals by the presence of the bulky POSS moieties. Thus, the amphiphilic telechelics of PEG1K and PEG2K are amorphous oligomers. The $T_g$ values of the soft PEO segments in the case of the amphiphilic telechelics of PEG1K and PEG2K were contrary to expectation, a little decreased with an increase of POSS content, suggesting that the amorphous properties of PEO segments were unexpectedly enhanced by incorporating the POSS macromers (FIG. 7). The detailed results of the thermal analysis carried out are summarized in Table 2 which follows:

TABLE 2

Thermal properties of the amphiphilic telechelics

| (POSS)$_a$/ (EG)$_b$/ (POSS)$_a$ | POSS$^a$ (wt %) | $T_m(\Delta H_m)$ of pure PEG homopolymers (° C., J/g) | $T_m(\Delta H_m)$ of amphiphilic telechelics (° C., J/g) | $T_c(\Delta H_c)$ of amphiphilic telechelics (° C., J/g) | $T_g$ of PEG segments$_b$ (° C.) | Residual char yield$^c$ (m$_{ch}$,%) |
|---|---|---|---|---|---|---|
| 1/22/1 | 68.1 | 39.1 (180.4) | None | None | −50.0 | 29 |
| 1/44/1 | 52.7 | 53.8 (176.2) | None | None | −57.7 | 11 |
| 1/74/1 | 40.7 | 59.8 (176.5) | 20.6 (37.8) | −13.2 (37.5) | −42.8 | 5 |
| 1/174/1 | 23.6 | 63.0 (178.8) | 49.7 (100.1) | 16.2 (94.6) | −47.3 | 3 |
| 1/217/1 | 19.8 | 62.8 (126.8) | 53.0 (102.6) | 29.6 (100.8) | −50.9 | 4 |

$^a$Calculated by $^1$H NMR.
$^b$Data were gathered on the 2$^{nd}$ heating curve with a heating rate of 10° C./min on the quenched samples with liquid nitrogen.
$^c$Residual char yield was taken as the mass percentage remaining at T = 700° C.

PEG oligomers have been studied for their melting behavior, revealing sensitivity of the melting point to polydispersity, even at small levels. It was therefore anticipated that dramatic alteration in melting behavior of the present telechelics would occur. FIG. 6 represents the DSC thermograms (second scans) of the PEG homopolymers and the amphiphilic telechelics with various PEO contents. In the case of PEG homopolymers, as shown in FIG. 6(a), narrow melting points ($T_m$) of the PEG homopolymers were clearly observed, $T_m$ following an inverse relationship with molecular weight (inset in FIG. 6(a)). On the other hand, distinct melting patterns were found in the synthesized amphiphilic telechelics. The $T_m$ for the amphiphilic telechelics of PEG10K and PEG8K were observed at 50 and 53° C., respectively, which are both slightly lower temperatures compared to the melting point of PEG homopolymer. Unexpectedly the $T_m$ of the amphiphilic telechelic of PEG3.4K was shifted to a lower temperature, observed at about room temperature (20° C.), while the peak was broadened. These results suggest that an increased disturbance in ordering attributed to the large steric hindrance of amorphous rigid POSS blocks results in less intermolecular or intramolecular interaction between PEO segments during crystallization. Accordingly, a small decrease in $\Delta H_m$ is found as the POSS macromers are incorporated. $T_g$ values of the soft PEO segments in the amphiphilic telechelics of PEG10K, PEG8K, and PEG3.4K were progressively shifted to higher temperature with an increase of POSS content, although the From the measured values of $\Delta H_m$ due to melting of the amphiphilic telechelics of PEG3.4K, PEG8K, and PEG10K, the percentages of PEO crystallinity were approximated by integrating the endothermal peak and normalizing the resulting latent heat by a reference value for 100% crystalline poly(ethylene oxide) (198 J/g). The crystallinity of amphiphilic telechelics of PEG3.4K, PEG8K, and PEG10K were thus determined to be 19.1%, 50.6%, and 51.8%, respectively. This result also indicates that the crystallinity of PEO segments is dramatically decreased when the POSS content in the amphiphilic telechelic is 40.7 wt %, and becomes amorphous beyond about 50 wt %.

The amphiphilic telechelics of the invention have many uses and particularly as nonionic surfactants with enhanced thickening behavior for use in the preparation of personal care products and are toughening additives for all polymers that are compatible with PEO, including epoxy, poly (methylmethacrylate), poly(vinylacetate), poly (ethylmethacrylate), sulfonated polystrene and polysulfone polymers. Other uses include drug delivery (POSS hydrophobe binding protein and PEO forming hydrogel for controlled release), for increasing permeability in contact lenses due to large POSS-based free-volume, and as modified PEO for high ionic conductivity (via low crystallinity) in battery applications.

The investigation of polymers incorporating polyhedral oligosilsesquioxane (POSS) has continued and a class of new hybrid thermoplastic polyurethanes has been synthesized by reacting a polyol such as polyethylene glycol, polycaprolactone diol, polycyclooctene diol, trans-1,4-butadiene diol or transisoprene diol with a chain extender such as TMP cyclopentyldiol-POSS, TMP cyclohexyldiol-POSS, TMP isobutyldiol-POSS, trans-cyclo-hexane diol cyclohexane-POSS or transcyclohexanediolisobutyl-POSS and a diisocyanate such as 4,4'-diphenyl methylene diisocyanate.

The synthesis is a one step condensation polymerization and takes place as follows

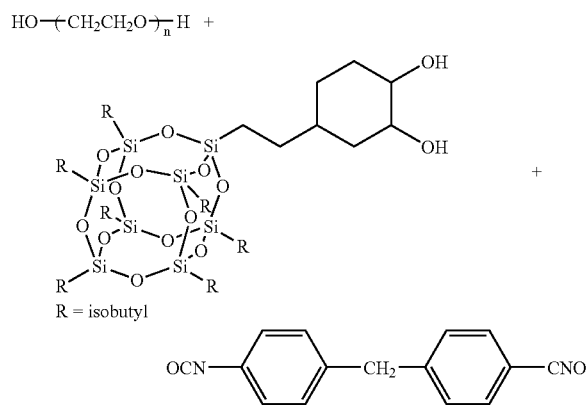

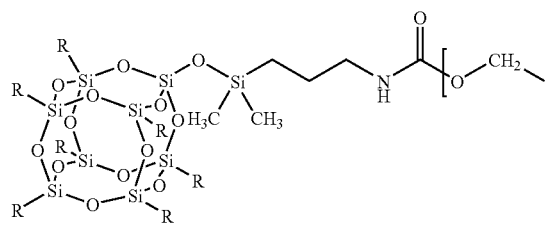

The products of the synthesis were dried thoroughly, dissolved in toluene to make a 10 wt % solution for casting films.

The dried films of polyurethanes were cut into thin strips for the tests of temporary shape fixing and subsequent recovery, or shape memory. For example, a sample was first heated on the hot stage to 65° C., which is well above the first transition temperature but low enough to avoid melting of the elastic network of the POSS-rich phase. Next, it was stretched to a certain degree of elongation and cooled down to the room temperature. The deformed shape was fixed at room temperature. Finally, the deformed sample was heated up again on hot plate to 65° C. and it was observed that the sample restored to its original length completely and within seconds. A similar phenomenon was observed when water was used as a stimulus for the shape recovery except that the sample secondarily swelled to form a tough hydrogel.

The hybrid polyurethanes formed are shape memory polymers, are biocompatible and biodegradable and can be used as medical devices and implants, can be dyed or rendered radio-opaque and also used as thermal sensors, seals and safety valves. They are particularly suitable as stents, patches and other implants for human health care applications.

We claim:

1. An amphiphilic telechelic incorporating POSS having the following structure

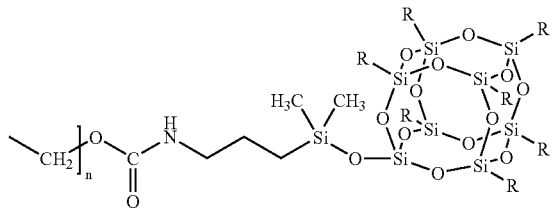

wherein R is selected from the group of cyclohexyl, cyclopentyl. cyclocetyl, methyl, ethyl, n-propyl, isopropyl, n-butyl, isobutyl, styryl, vinyl, allyl, cthylphenyl, phenyl, biphonyl, and naphithyl; and n is 1 to 23,000.

2. An amphiphilic telechelic incorporating POSS according to claim 1 wherein R is cyclohexyl.

3. An amphiphilic telechelic incorporating POSS according to claim 1 wherein n is 23 to 227.

4. An amphiphilic telechelic incorporating POSS according to claim 1 having a POSS content from about 19.0 to about 70.0 wt %.

5. An amphiphilic telechelic incorporating POSS according to claim 1 having molecular weight of about 3300 to 13,000 g/mol.

6. A method for forming amphiphilic telechelics incorporating POSS which comprises reacting polyethylene glycol homopolymer and POSS macromer, wherein the monoisocyanate groups of two of said POSS macromers are directly linked to the diol end groups of said polyethylene glycol homopolymer, and wherein the amphiphilic telechelic incorporating POSS has the structure

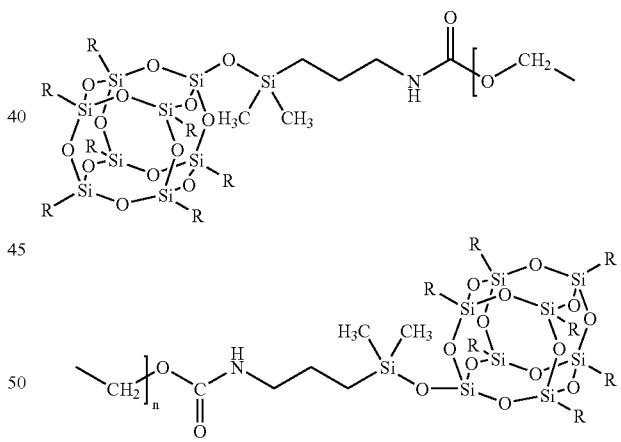

wherein R is an unreactive aliphatic or aryl group and n is 1 to 23,000.

7. A method according to claim 6 wherein said reaction is carried out in the presence of dibutyl tin dilaurate as catalyst.

8. A method according to claim 5 wherein said polyethylene glycol has a molecular weight of about 62–1,000,000 g/mol.

9. A method according to claim 6 wherein said polyethylene glycol has a molecular weight of about 100 to 10,000 g/mol.

10. A method according to claim 6 wherein said POSS macromer has the formula

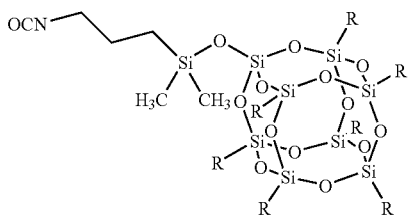

wherein R is selected from the group of cyclohexyl, cyclopentyl, cyclooctyl, methyl, ethyl, n-propyl, isopropyl, n-butyl, isobutyl, styryl, vinyl, allyl, ethylphenyl, phenyl, biphenyl, and naphthyl.

11. A method according to claim 6 wherein said POSS macromer is isocyanatopropyldimethylsilyloxycyclohexyl-POSS.

12. A method according to claim 6 wherein said polyethylene glycol has a molecular weight of about 62–1,000,000 g/mol and said POSS macromer is isocyanatopropyldimethylsilyloxycyclohexyl-POSS.

13. A method according to claim 6 wherein the ratio of polyethylene glycol to POSS macromer used in the reaction is about 1:1.8–2.20.

14. A method according to claim 6 which comprises introducing the POSS macromer into the reaction in an amount to provide about 19.0 to about 70.0 wt % of POSS macromer in the amphiphilic telechelic produced.

15. An amphiphilic telechelic made by the method of claim 6.

16. An amphiphilic telechelic made by the method of claim 11.

17. A nonionic surfactant characterized by enhanced thickening behavior comprising an amphiphilic telechelic according to claim 1.

18. A toughening additive for polymers selected from the group consisting of epoxy, polymethylmethacrylate, polyvinylacetate, polyethylmethacrylate, sulfonated styrene and polysulfone comprising an amphiphilic telechelic according to claim 1.

19. A solid polymer electrolyte, consisting of an amphiphilic telechelic according to claim 1 or a blend of such amphiphilic telechelic with unmodified PEGs.

\* \* \* \* \*